March 8, 1927.
F. H. ARNZEN
1,619,846
CHAIN EQUIPMENT FOR TIRES
Filed Jan. 21, 1926  2 Sheets-Sheet 1
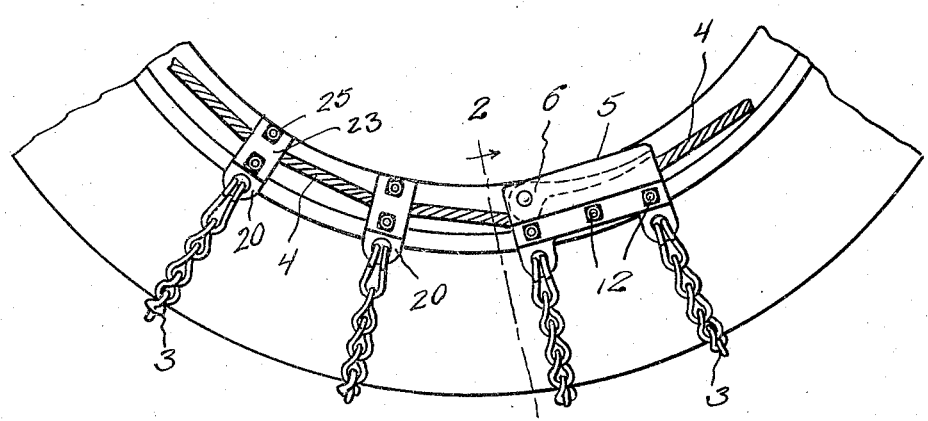
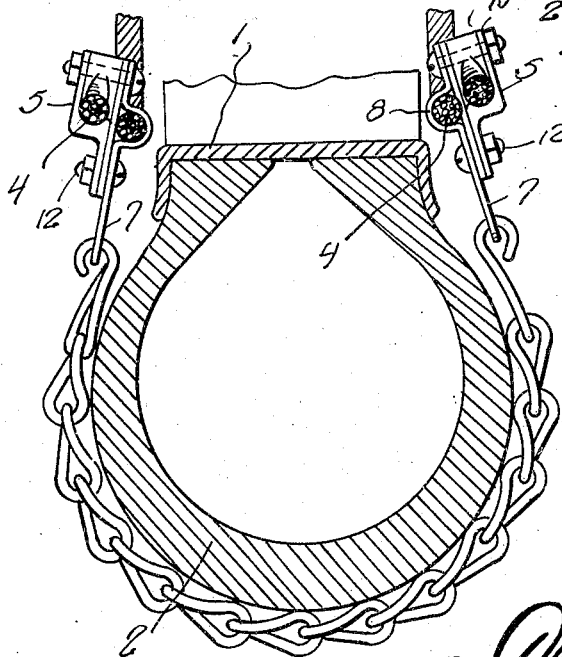
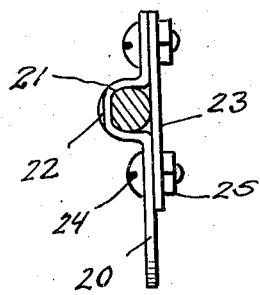
Inventor
*F. H. Arnzen,*
By *Clarence A. O'Brien*
Attorney March 8, 1927.
F. H. ARNZEN
1,619,846
CHAIN EQUIPMENT FOR TIRES
Filed Jan. 21, 1926     2 Sheets-Sheet 2
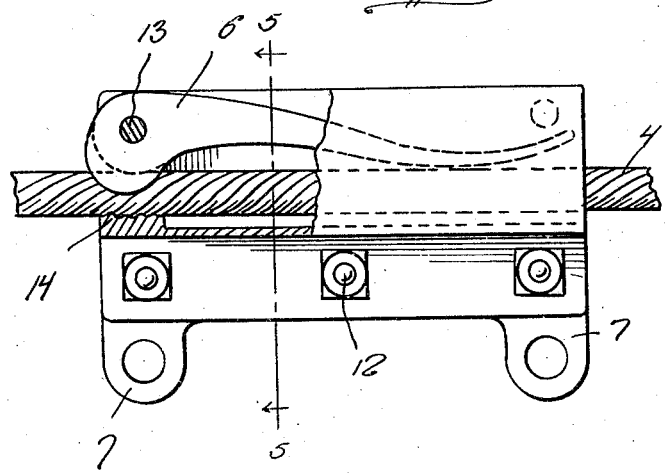
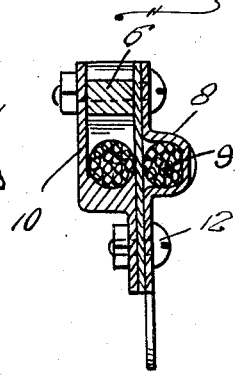
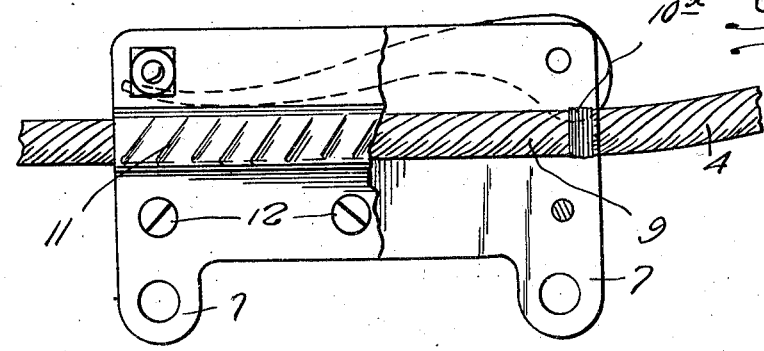
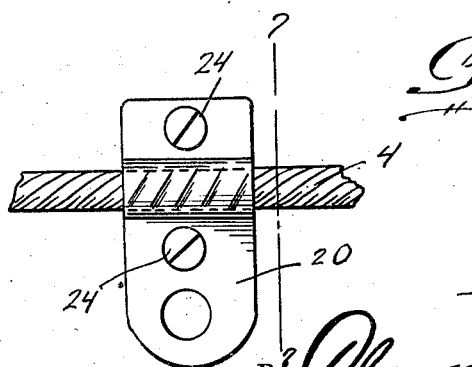
Inventor
F. H. Arnzen,
By Clarence A. O'Brien,
Attorney Patented Mar. 8, 1927.

1,619,846

UNITED STATES PATENT OFFICE.

FRANK H. ARNZEN, OF GRANGEVILLE, IDAHO.

CHAIN EQUIPMENT FOR TIRES.

Application filed January 21, 1926. Serial No. 82,728.

My present invention has to do with tire chains and the like; and it has for its general object the provision of a chain equipment for automobile wheel tires constructed in such manner that it is feasible to employ wire or other appropriate cables in lieu of the conventional side chains, the said cables by virtue of my improvement being quickly and easily applied and susceptible of ready tightening, and being also secured in a taut state in such manner that there is no liability of the cables becoming loose in use.

Other objects and practical advantages of the invention will be fully understood from the following description and claims when the same are read in connection with the drawings, accompanying and forming part of this specification, in which:—

Figure 1 is a detail view in side elevation showing a portion of a tire and the preferred embodiment of my invention thereon.

Figure 2 is an enlarged transverse section taken in the plane indicated by the line 2—2 of Figure 1.

Figure 3 is an enlarged detail view illustrating the fastener complementary to one of the wire cables and also illustrating the housing for said fastener, said housing being partially broken away.

Figure 4 is a view showing the inner side of the said housing, and with a part broken away.

Figure 5 is a transverse section taken in the plane indicated by the line 5—5 of Figure 3.

Figure 6 is a detail elevation illustrative of one of the chain connections.

Figure 7 is a cross section taken in the plane indicated by the line 7—7 of Figure 6.

Similar numerals of reference designate corresponding parts in all of the views of the drawings.

The rim 1 and tire casing 2 shown in Figures 1 and 2 may be and preferably are of the ordinary well known construction. The transverse chains 3 which straddle the tire 2 at intervals are also by preference of the ordinary construction though they may be of any other construction compatible with the purpose of my invention without affecting the latter. For the holding of the said transverse chains or chain sections 3 in working position on the tire 2, I employ cables 4 of wire or other appropriate material. The said cables 4 are flexible in character and are disposed at opposite sides of the rim 1 and one end of each cable 4 is permanently secured in a housing 5, and the other end of the cable is designed to be carried through and beyond the housing 5, Figure 4, so that its extended portion will afford a convenient hand grasp designed to enable an operative to draw the cable taut precedent to the detachable, strong and secure fastening of the cable through the medium of the element 6. The said element 6 is in the form of a cam lever as illustrated by dotted lines in Figure 1 and by full lines in Figures 2, 3 and 4. The housing 5 alluded to is equipped with apertured ears 7 for the connection of adjacent ends of two transverse chain sections 3, and it is also provided with a sheath 8 for the reception of the end portion 9, Figure 4, of the cable 4, and is also provided with a sheath or channeled portion 10 for the reception of the end portion of the cable 4 as shown in Figure 3. The cable end 9 is preferably wrapped at 10* to prevent fraying thereof, and it will be noted that the wall of the sheath 8 is toothed in appropriate manner as designated by 11 so as to positively hold the cable end 9 and preclude the possibility of the said cable end being withdrawn from the housing when the cable end is clamped in the sheath 8 by the tightening of the nuts on the bolts 12. As made clear by Figures 5 and 4, the said teeth 11 are preferably formed by the making of indentures in the wall of the sheath 8. It will be manifest from the foregoing that the housing 5 in the preferred embodiment of the invention is formed of metallic sections; and it will also be manifest that the fastening lever 6 is pivoted in the channel portion 10 of the housing as designated by 13, and that a portion of the housing opposite the head of the fastening lever 6 is thickened and is provided with teeth as designated by 14 in Figure 3 so that when the fastening lever 6 is positioned as shown in Figure 3 the end portion of the cable 4 will be strongly clamped against the toothed anvil or portion 14 and will thereby be positively held against endwise movement or slipping.

It will be gathered from the foregoing that a cable 4 and a housing 5 and appurtenances will be employed at each side of the rim 1, Figure 2; and it will also be understood that when the lever 6 is swung to open or idle position, the cable 4 may be conveniently drawn so as to be tightened about the wheel, and then while the cables are manually held in a taut state, the levers 6 may be moved to the positions illustrated, whereupon the end portions of the cables will be securely though detachably fastened to the housings 5.

As before indicated two of the transverse chains 3 which straddle the tire 2 are connected to apertured ears on the housings 5 at opposite sides of the tire, and I would here have it understood that the other transverse chains 3 are connected at their ends to apertured plates 20 secured on the cables 4 at intervals in the length of the said cables. The plates 20 are provided with cable receiving channel portions 21, and the said channel portions 21 are appropriately toothed as designated by 22 so that the plates 20 will be positively fixed on the cables 4 and against casual shifting or displacement; it being understood in this connection that associated with each plate 20 is a retaining plate 23 connected to the plate 20 through the medium of bolts 24 and nuts 25.

It is well known to motorists that tire chains such as used on automobile wheels are liable to easily wear and are difficult to tighten and to properly apply to a tire, and therefore the facility with which my improvement may be applied will be appreciated as an important feature of my invention. It will also be appreciated that my improvement is simple in construction, light in weight, and is well adapted to withstand the usage to which wheel appurtenances are ordinarily subjected; and it will further be manifest that one of the important features of my invention is to be found in the means whereby the side cables 4 may be expeditiously and easily tightened on a wheel and may then be as readily fastened in detachable manner though without liability of either cable being casually released. Carried as stated on a wheel, the side cables 4 may be depended upon to strongly hold the transverse chains 3 in working position upon the tire and in proper spaced relation so as to afford the traction increasing and antislipping qualities desirable in tire chains.

I have entered into a detailed description of the construction and relative arrangement of the parts embraced in the present and preferred embodiment of my invention in order to impart a full, clear and exact understanding of the said embodiment. I do not desire, however, to be understood as confining myself to the specific construction and relative arrangement of parts as disclosed, my invention being defined by my appended claims within the scope of which changes in structure and changes in arrangement may be made without departure from my invention.

Having described my invention, what I claim and desire to secure by Letters Patent, is:—

1. As a new article of manufacture, a housing for the purpose described having a channel portion open at its ends and also having a sheath alongside the channel portion, said channel portion and sheath equipped with teeth, and a cam lever mounted in the channel portion and adapted to clamp and detachably hold a portion of a cable or the like against and to the housing; the said sheath being connected with the remainder of the housing to clamp and hold one end portion of a cable or the like against the housing.

2. As a new article of manufacture, a housing for the purpose described having a channel portion open at its ends and equipped with interior teeth, a cam lever mounted in the channel portion and adapted to clamp and detachably hold a portion of a cable or the like against said teeth, and a sheath arranged alongside the remainder of the housing and connected thereto to clamp and hold one end portion of a cable or the like against the remainder of the housing.

3. As a new article of manufacture, a housing for the purpose described having a channel portion open at its ends, a cam lever mounted in the channel portion and adapted to clamp and detachably hold a portion of a cable or the like against the same, and a sheath arranged alongside the remainder of the housing and connected thereto to clamp and hold one end portion of a cable or the like against the remainder of the housing.

In testimony whereof I affix my signature.

FRANK H. ARNZEN.